United States Patent
Wu

(10) Patent No.: US 10,683,957 B2
(45) Date of Patent: Jun. 16, 2020

(54) PIPE CONNECTING JOINT

(71) Applicant: E HONG XING TECHNOLOGY CO., LTD, Tongxiao Township, Miaoli County (TW)

(72) Inventor: Chih-Tsung Wu, Tongxiao Township, Miaoli County (TW)

(73) Assignee: E HONG XING TECHNOLOGY CO., LTD, Miaoli County (TW)

( * ) Notice: Subject to any disclaimer, the term of this patent is extended or adjusted under 35 U.S.C. 154(b) by 387 days.

(21) Appl. No.: 15/883,479

(22) Filed: Jan. 30, 2018

(65) Prior Publication Data
US 2019/0049051 A1  Feb. 14, 2019

(30) Foreign Application Priority Data

Mar. 23, 2017  (TW) .............................. 106109720 A

(51) Int. Cl.
*F16L 7/00* (2006.01)
*F16L 39/00* (2006.01)

(52) U.S. Cl.
CPC .............. *F16L 39/005* (2013.01); *F16L 7/00* (2013.01); *F16L 2201/30* (2013.01)

(58) Field of Classification Search
CPC ..... F16L 7/00; F16L 7/02; F16L 39/00; F16L 55/17; F16L 55/172; F16L 55/178
USPC ..................... 285/123.4–123.14; 138/99, 113
See application file for complete search history.

(56) References Cited

U.S. PATENT DOCUMENTS

| | | | | |
|---|---|---|---|---|
| 1,928,570 A * | 9/1933 | Mustico | ................ | F16L 55/172 138/99 |
| 2,737,402 A * | 3/1956 | De Frumerie | ............ | F16L 9/18 285/123.4 |
| 4,694,865 A * | 9/1987 | Tauschmann | ........... | F16L 59/06 138/113 |
| 4,781,402 A * | 11/1988 | Ream | ..................... | F16L 39/005 285/123.16 |
| 5,368,338 A * | 11/1994 | Greene | ................... | F16L 39/00 285/123.16 |
| 5,402,831 A * | 4/1995 | Hollis | ..................... | F16L 39/00 138/109 |
| 6,003,559 A * | 12/1999 | Baker | ..................... | F16L 59/12 138/108 |
| 6,749,367 B1 * | 6/2004 | Terry, III | ................ | E03F 1/002 138/113 |
| 8,074,687 B2 * | 12/2011 | Queau | ................... | F16L 39/005 138/112 |
| 8,991,871 B2 * | 3/2015 | Weinhold | .............. | F16L 3/1222 285/123.12 |
| 2009/0050229 A1 * | 2/2009 | Kim | ...................... | F16L 59/065 138/149 |
| 2016/0010782 A1 * | 1/2016 | Skinner | ................... | F16L 55/18 285/15 |

* cited by examiner

*Primary Examiner* — Aaron M Dunwoody

(57) ABSTRACT

A pipe connecting joint has: a connecting member and two limiting pipes. The connecting member has the two sleeves and the two covers. The sleeve has at least a positioning groove at an inner wall surface, and at both ends of each sleeve is formed with an opening. Furthermore, each sleeve is opened with a window covered by the cover. The two limiting pipe are formed with a semicircular pipe and a disc, and the limiting pipe is placed into the sleeve through the window. The disc abuts against the inner wall surface of sleeve and engages with the position groove.

10 Claims, 8 Drawing Sheets

PIPE CONNECTING JOINT

BACKGROUND OF THE INVENTION

1. Field of the Invention

The present invention relates to a pipe connecting joint, and more particularly to a chemical pipe connecting joint.

2. Description of the Related Art

In conventional chemical transportation pipeline structure, due to the chemical may be highly corrosive, toxic or likely to cause environmental pollution, the chemical transportation pipeline are required to have an inner tube, and the inner tube is jacketed with an outer pipe for isolation protection. When the inner tube is damaged, the outer tube can reduce the harm and loss caused by the leakage. However, it is not difficult to find out some shortcomings in the conventional structure as following: the inner tube is directly pierced through the inside of the outer tube, if the length is too long the inner tube gravity will lead to its contact with the outer tube. When the fluid flows through the inner tube, the inner tube might have a vibration and rocking situation caused by fluid pressure, resulting in continuous friction with outer tube, not only will produce flow noise, but also make the friction site thinning and damaged. Therefore, the fluid will leak easily, which causes the risks of harm and the cost of replacing the pipeline, Therefore, it is desirable to provide a pipe connecting joint to mitigate and/or obviate the aforementioned problems.

SUMMARY OF INVENTION

An objective of present invention is to provide a retractable hose storage device which is capable of improving the above-mention problems.

In order to achieve the above mentioned objective, a pipe connecting joint has: a connecting member and two limiting pipes. The connecting member has the two sleeves and the two covers. The sleeve has at least a positioning groove at an inner wall surface, and at both ends of each sleeve is formed with an opening. Furthermore, each sleeve is opened with a window covered by the cover. The two limiting pipe are formed with a semicircular pipe and a disc, and the limiting pipe is placed into the sleeve through the window. The disc abuts against the inner wall surface of sleeve and engages with the position groove.

Other objects, advantages, and novel features of invention will become more apparent from the following detailed description when taken in conjunction with the accompanying drawings.

DETAILED DESCRIPTION OF PREFERRED EMBODIMENT

Figure 1:
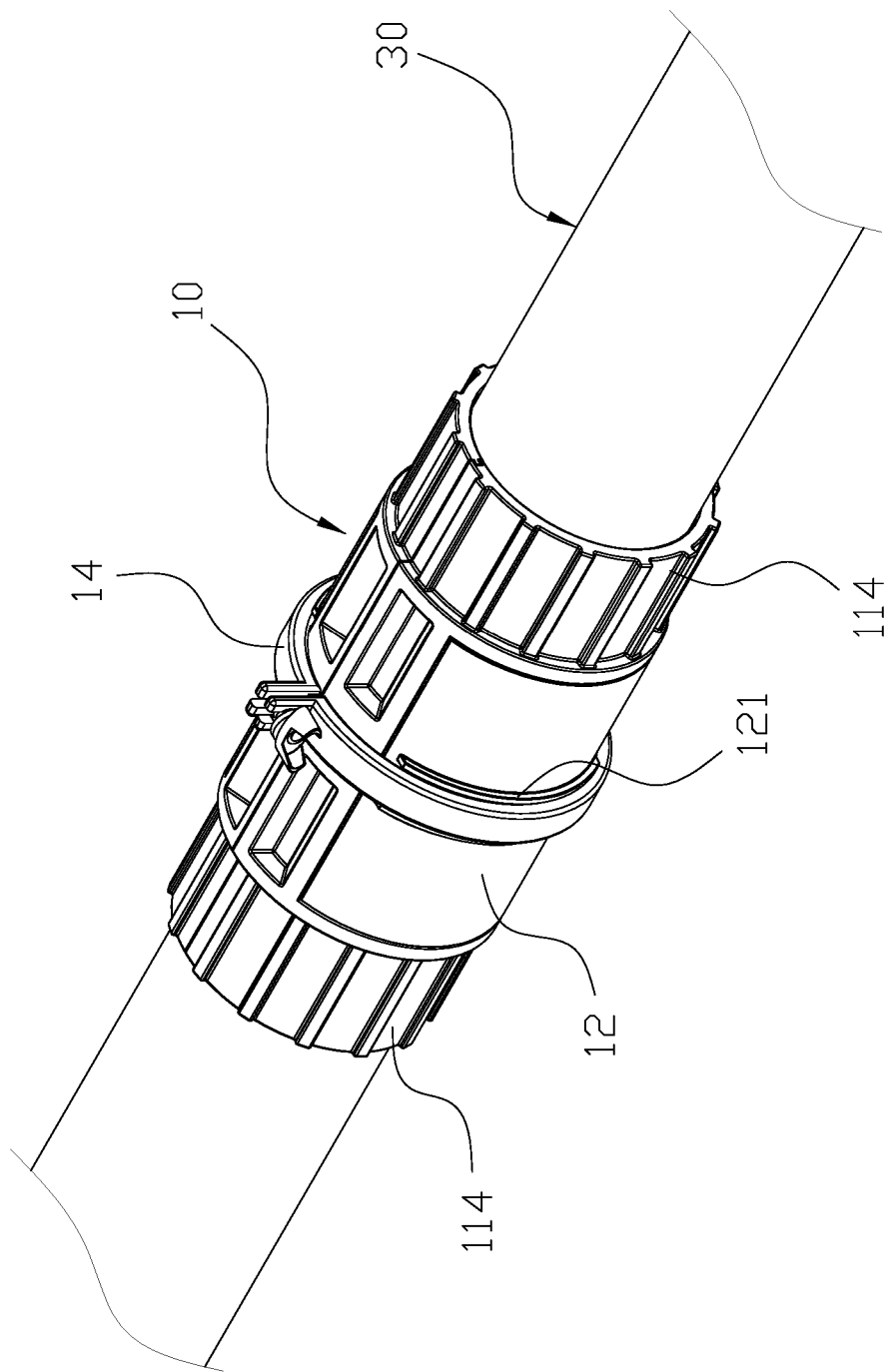
FIG. 1 is a perspective view of the present invention.
Figure 2:
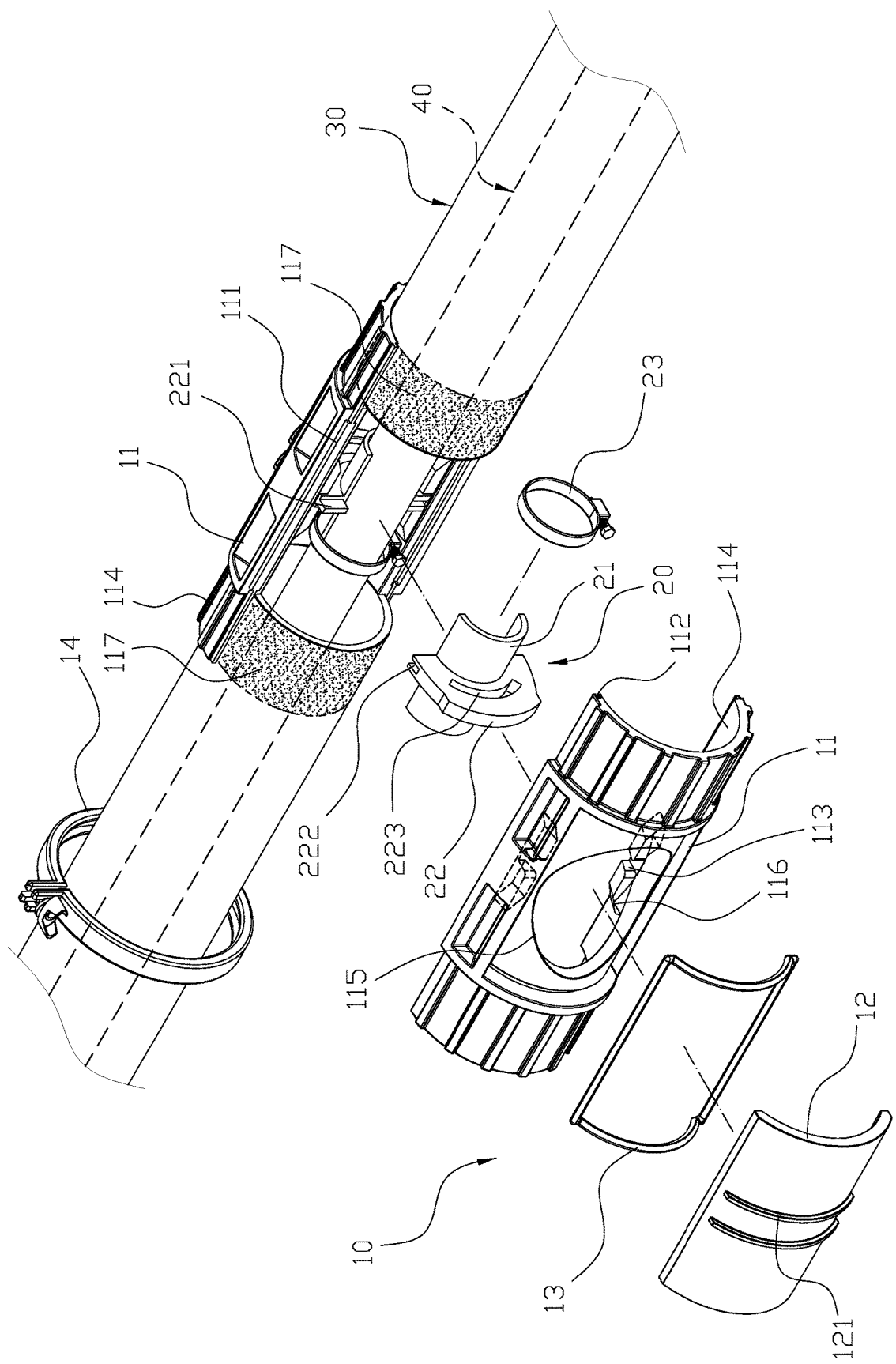
FIG. 2 is an exploded perspective view of the present invention.
Figure 3:
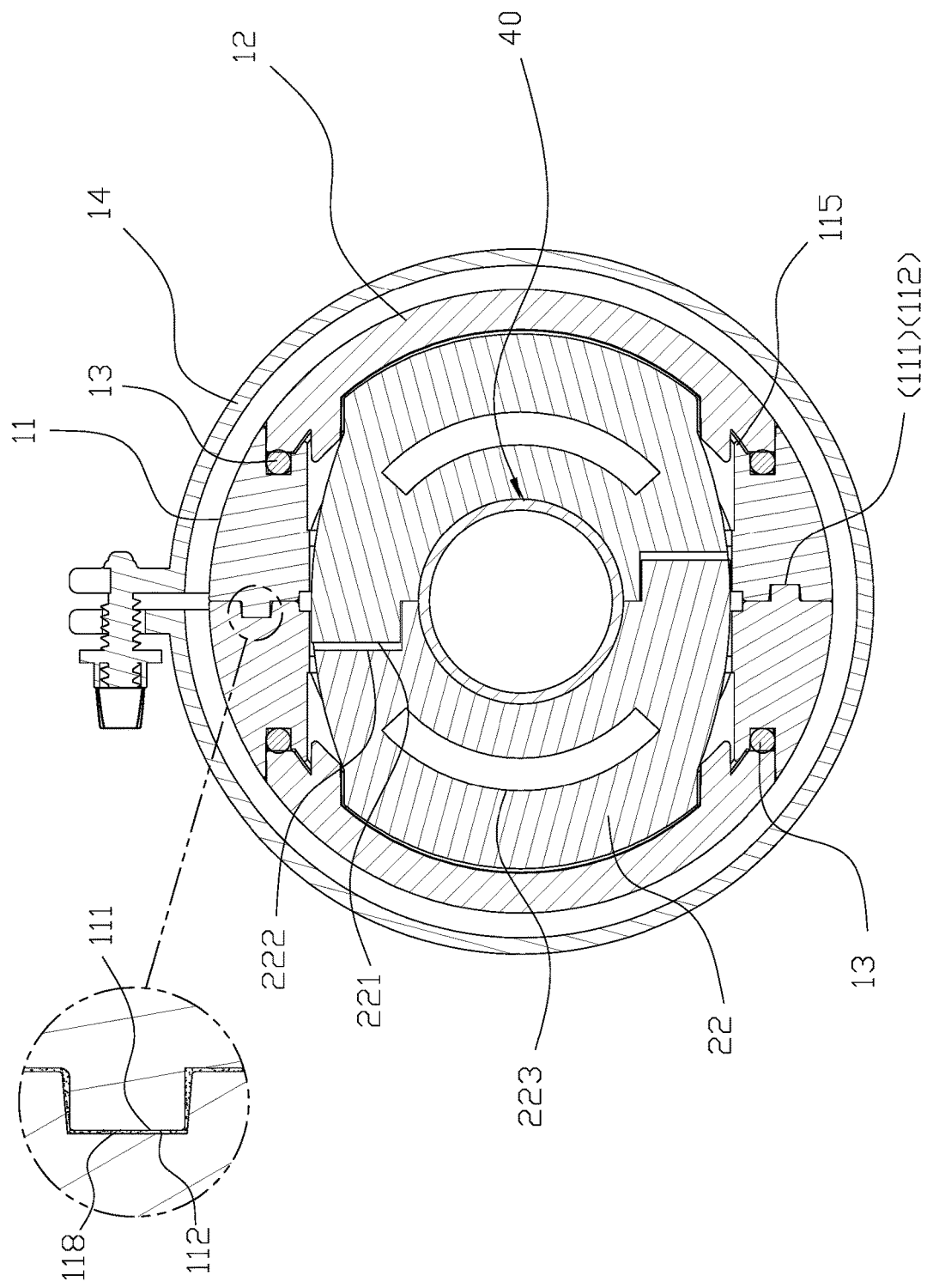
FIG. 3 is a sectional view of the present invention.
Figure 4:
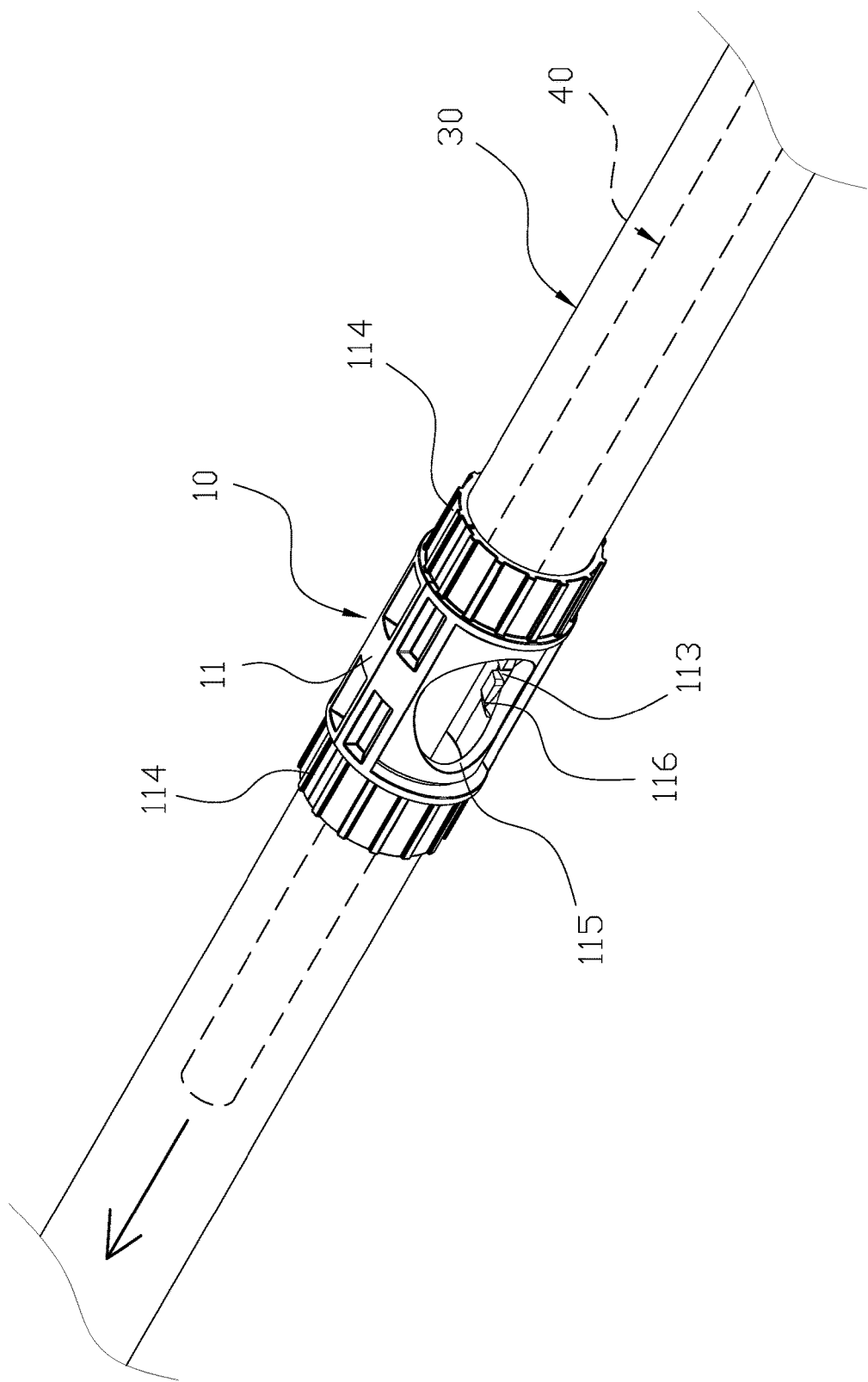
FIG. 4 is a schematic drawing of a first embodiment of the present invention.
Figure 5:
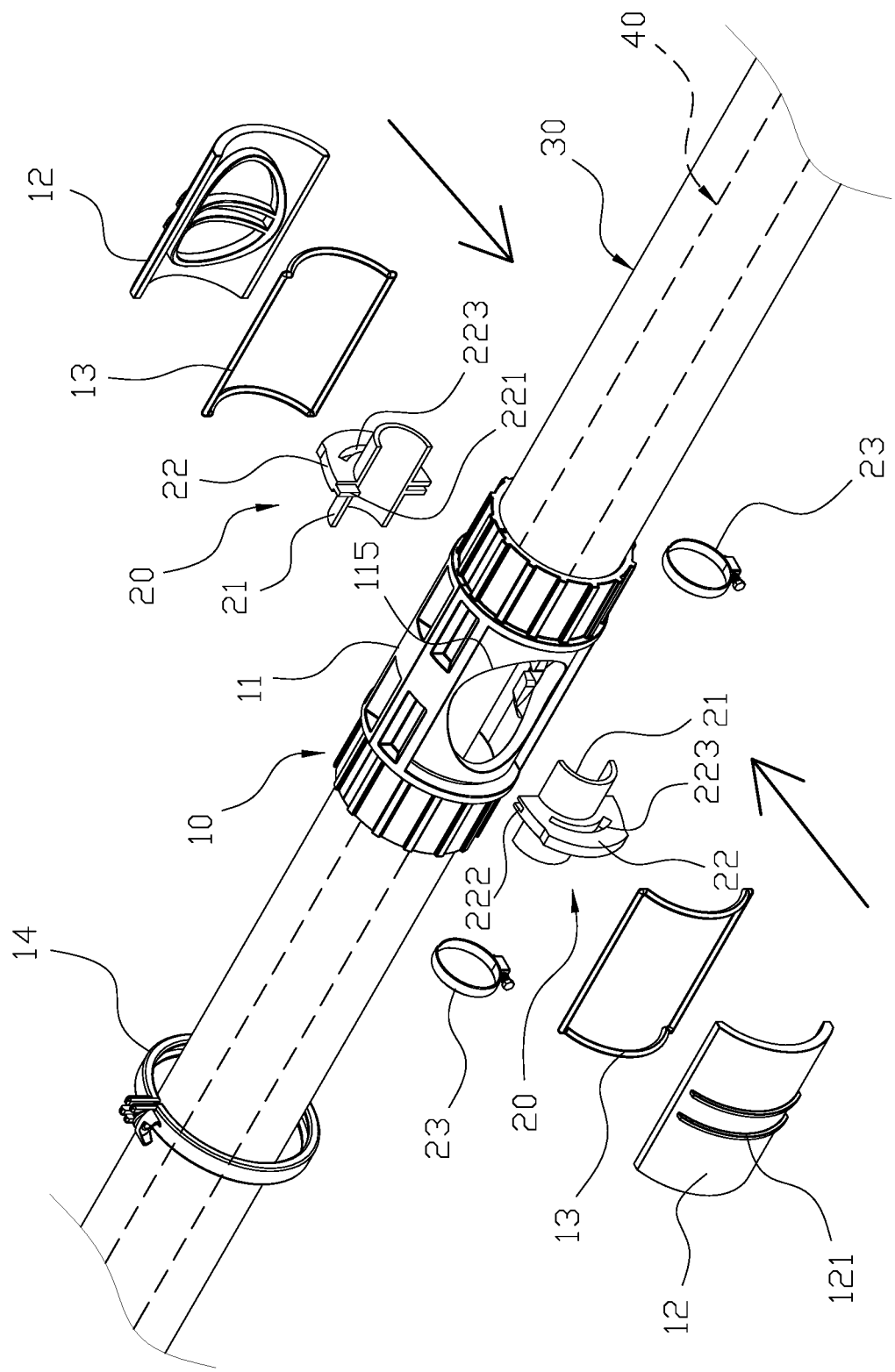
FIG. 5 is another schematic drawing of the first embodiment of the present invention (b).

First, please refer to FIG. 1 to FIG. 3. A pipe connecting joint comprises: a connecting member 10 and the two limiting pipe 20. The connecting member 10 has two sleeves 1 land two covers 12. The two sleeve 11 are aligned adjacent to each other and respectively have a corresponding raised side 111 and a corresponding recessed side 112 for secure engagement of the two sleeves 11. The raised side 111 and the recessed side 112 of the sleeves 11 are coated with an adhesive layer 118 for sealing purpose. Furthermore, at least one positioning groove 113 is provided inside of each sleeve 11, and an opening 114 of each sleeve 11 is connected to an outer pipe 30 of an external transportation pipe, each sleeve having a window covered by the cover. The opening 114 of the connecting member 10 is coated with an adhesive layer 117 to be adhered onto the outer pipe 30 of the external transportation pipe for sealing purpose. Each sleeve 11 has a window 115 covered by the cover 12. Moreover, a sealing washer 13 is disposed between each sleeve 11 and the corresponding cover 12. Each cover 12 is further provided with two stopping strips 121, and each sleeve 11 is sleeved with a constricting band 14 between the two stopping strips 121 which tightens and secured the sleeve 11 and the cover 12 together. The two sleeves 11 are each further provided with at least one internal inclined surface 116 for assisting a corresponding inner pipe 50 of the external transportation pipe to pass the positioning groove 113. Each limiting pipe 20 is provided with a semicircular pipe 21 and a disc 22, and each limiting pipe 20 is disposed inside of a respective one of the two sleeves 11 through the window 115. Each semicircular pipe 21 supports the inner pipe 40 of the corresponding external transportation pipe, and each disc 22 pushes against an inner wall of the corresponding sleeve 11 and engages with the positioning groove 113. The two discs 22 of the two limiting pipes 20 are respectively provided with a raised portion 221 and a recessed portion 222 for secure engagement of the two limiting pipes 20. Each limiting pipe 20 is tightened by way of at least one a sealing member 23 at the corresponding semicircular pipe 21. Therefore, the limiting pipe 20 is securely supported in the connecting member 10, which provides extension for the outer pipe 30 and support for the inner pipe 40. The limiting pipe 20 is further provided with at least one through opening 223 at the corresponding disc 22 connected to the outer pipe 30.

In a first embodiment, as shown in FIG. 2 to FIG. 5, when pipe connecting joint of the present invention is applied to a transportation pipes system, the outer pipe 30 is divided into to a suitable length to form a plurality of segments, and the outer pipe 30 is connected to the sleeve 11 of the connecting member 10 so that the opening 11 of the sleeve 11 can be sleeved with the outer pipe 30 to form a connection. The two sleeves 11 are engaged and fixed with the raised side 111 and the recessed side 112, and then the inner pipe 40 is put through the outer pipe 30 and the sleeve 11 to form a pipe-in-pipe state. The inner pipe 40 can successfully navigate through the positioning groove 113 of the sleeve 11 by means of the inclined surface 116. The limiting pipe 20 is further inserted into the sleeve 11 from the window 115, the inner pipe 40 is sleeved with the two semicircular pipe 21, and the disc 22 is engaged and fixed with the recessed portion 222 and the raised portion 221. Then the disc 22 abuts against the inner wall of the sleeve 11 and engages with the positioning groove 113, thereby stabilizing the sleeve 11 and the limiting pipe 20 relative position, and the inner pipe 40 is fixed in the center of the outer pipe 30. At this moment, the inner pipe 40 and the outer pipe 30 mutually have non-contact, and then the sealing member 23 locks the limiting pipe 20 of the semicircular pipe 21 to more firmly secure the two limiting pipe 20. Finally, the cover 12 pushes against the washer 13 and covers the window 115 of the sleeve 11 and the constricting band 14 locks between the two stopping strips 121 of the sleeve 11 and the cover 12 to thereby more firmly secure the two sleeves 11 and the cover 12. With the combination of the above combination, the inner pipe 40 can completely has no contact with the outer pipe 30, and with the isolation protection provided the outer pipe 30, the vibration and rocking of the inner pipe 40 during the fluid delivery will not rub the outer pipe 30. Furthermore, with the through opening 223 provided by the limiting pipe 20 in the disc 22, so that the outer pipe 30 is in an all through state, such as in the event of a leak of the inner pipe 40, the leaking fluid can flow centrally through the through opening 223 into the outer opening 30 for centralized treatment.

Figure 6:
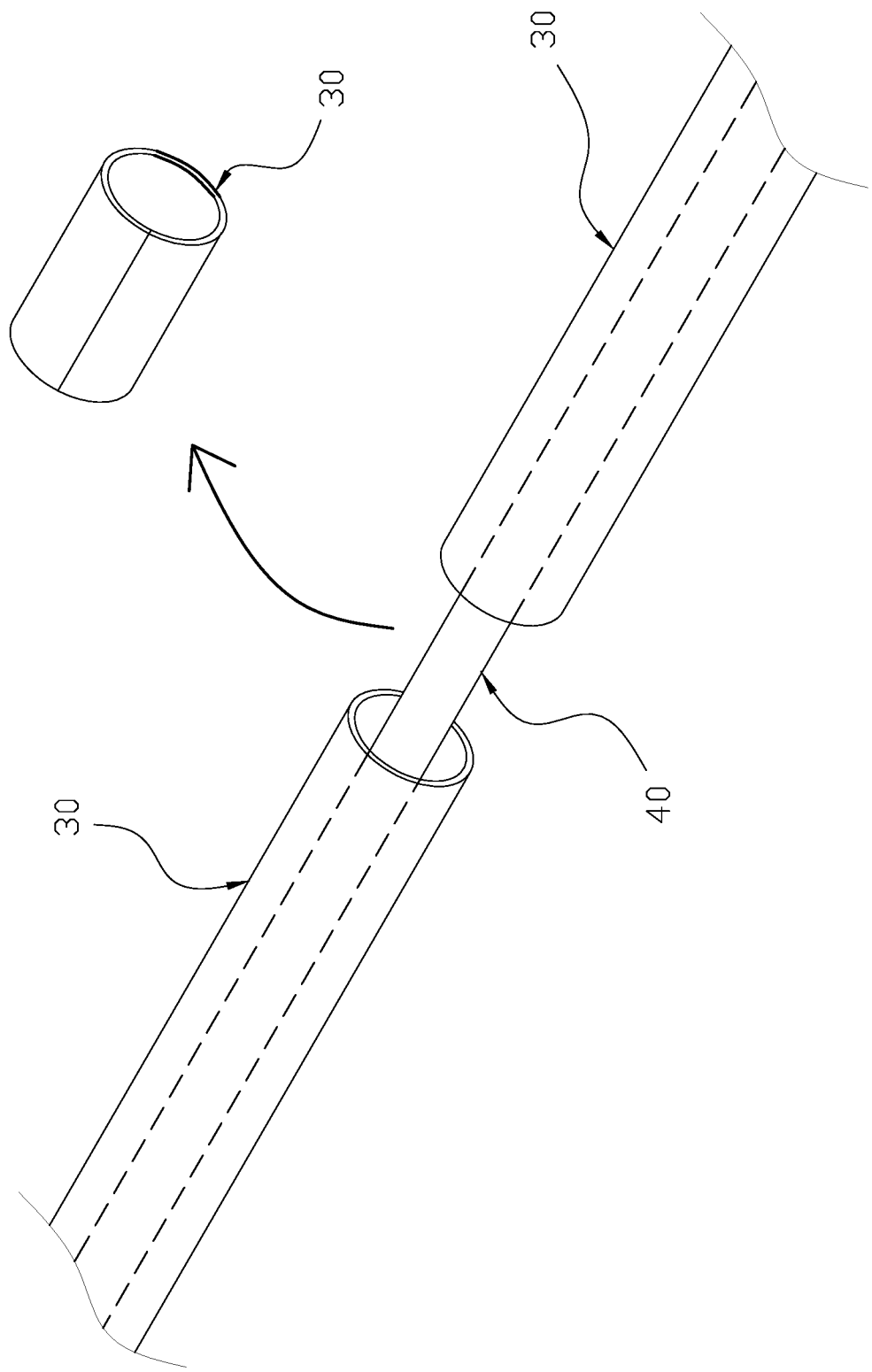
FIG. 6 is a schematic drawing of a second embodiment of the present invention.
Figure 7:
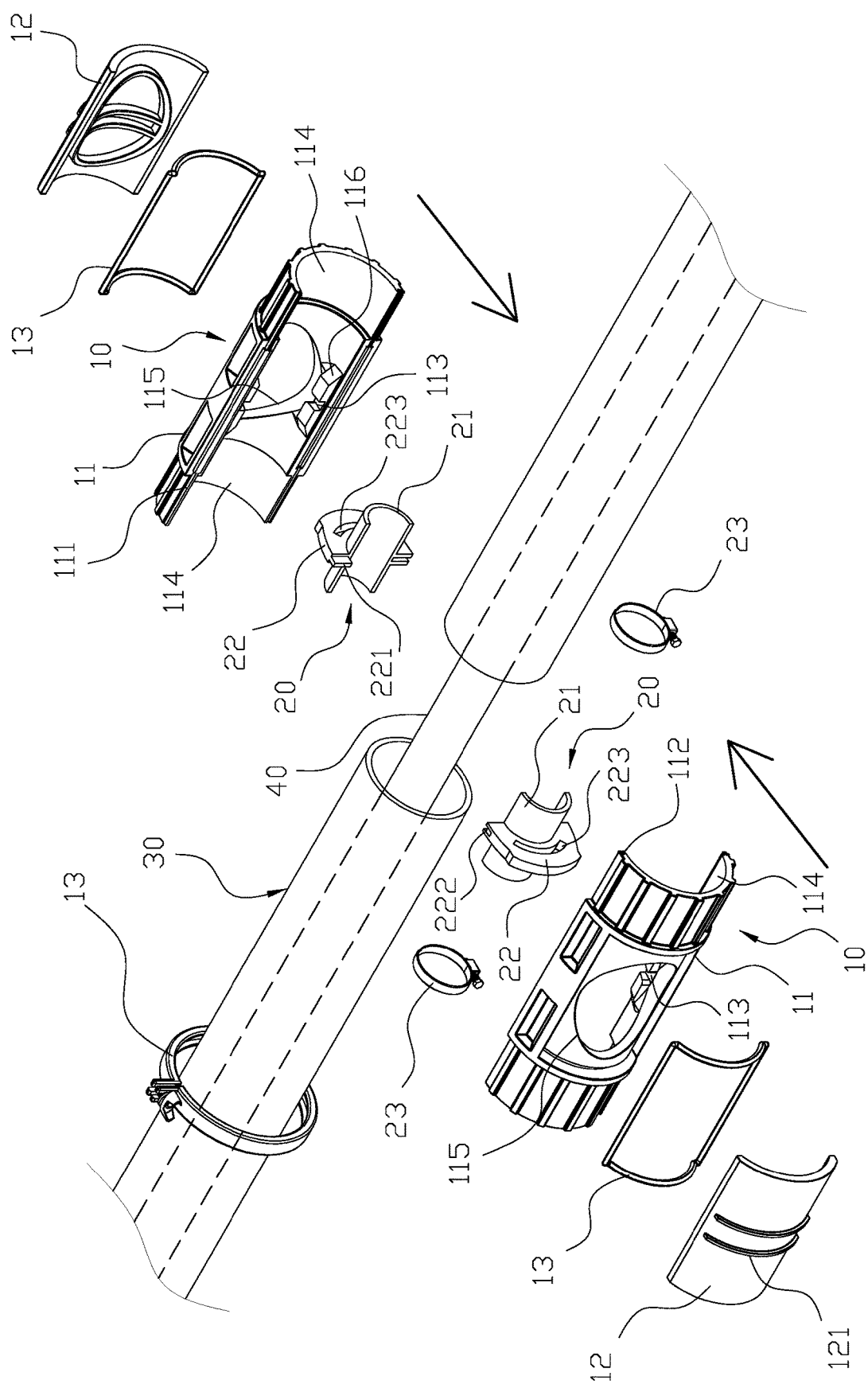
FIG. 7 is another drawing of the second embodiment of the present invention.
Figure 8:
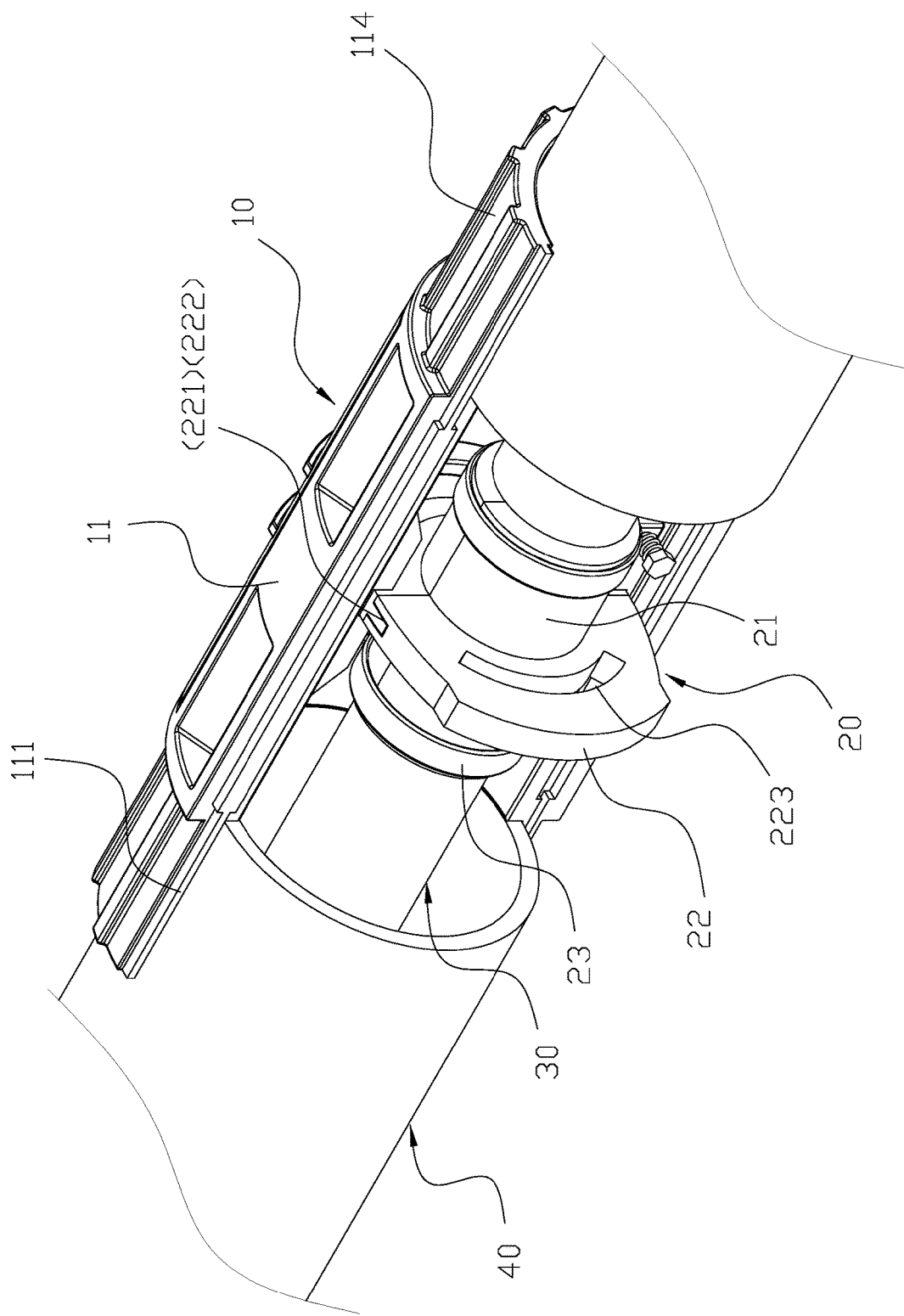
FIG. 8 is another drawing of the second embodiment of the present invention.

For a second embodiment, please refer to FIGS. 6, 7 and 8, with FIGS. 2 and 3. When the connecting device of the present invention is applied to an existing pipe, the outer pipe 30 is cut open, the semicircular pipe 21 of the limiting pipes 20 sleeve onto the inner pipe 40. With the raised portion 221 and the recessed portion 222 of the limiting pipes 20, the sealing member 23 also sleeves onto the semicircular pipe 21. Moreover, the sleeve 11 of the connecting member 10 is connected to the outer pipe 30 so that the opening 11 of the sleeve 11 is able to sleeves onto the outer pipe 30 to form a connection. Meanwhile, the raised side 111 and the recessed side 112 of the two sleeves 11 are engaged and fixed, and the disc 22 abuts against the inner wall of the sleeve 11 and engages with the positioning groove 113 to stabilize the relative positions of the sleeve 11 and the limiting pipe 20. Therefore, the inner pipe 40 is secured in the outer pipe 30 at the central position, and the inner pipe 40 and the outer pipe 30 mutually have non-contact with each. Finally, the cover 12 pushes against the washer 13 and covers the window 115 of the sleeve 11 and the constricting band 14 locks between the two stopping strips 121 of the sleeve 11 and the cover 12 to thereby more firmly secure the two sleeves 11 and the cover 12. With the combination of the above combination, the inner pipe 40 can completely has no contact with the outer pipe 30, and with the isolation protection provided the outer pipe 30, the vibration and rocking of the inner pipe 40 during the fluid delivery will not rub the outer pipe 30. The above-mentioned structure effectively enhances the durability, but also without having to replace all the existing transmission pipelines, can improve the existing damage transmission pipelines structure, which improves durability and reduces the cost of replacement effect.

Although the present invention has been explained in relation to its preferred embodiment, it is to be understood that many other possible modifications and variations can be made without departing from the spirit and scope of invention as hereinafter claimed.

What is claimed is:

1. A pipe connecting joint comprising:
a connecting member having two sleeves and two covers, the two sleeves aligned adjacent to each other, at least one positioning groove provided inside of each sleeve, an opening of each sleeve connected to an outer pipe of an external transportation pipe, each sleeve having a window covered by the cover; and
two limiting pipes are each provided with a semicircular pipe and a disc, each limiting pipe disposed inside of a respective one of the two sleeves through the window, and each semicircular pipe supporting an inner pipe of the corresponding external transportation pipe, each disc pushing against an inner wall of the corresponding sleeve and engaging with the positioning groove to support the corresponding limiting pipe in the connecting member.

2. The pipe connecting joint as claimed in claim 1, wherein each cover is further provided with two stopping strips, and each sleeve is sleeved with a constricting band between the two stopping strips.

3. The pipe connecting joint as claimed in claim 1, wherein the two sleeves are each further provided with at least one internal inclined surface for assisting the corresponding inner pipe of the external transportation pipe to pass the positioning groove.

4. The pipe connecting joint as claimed in claim 1, wherein a sealing washer is disposed between each sleeve and the corresponding cover.

5. The pipe connecting joint as claimed in claim 1, wherein the two sleeves respectively have a corresponding raised side and a corresponding recessed side for secure engagement of the two sleeves.

6. The pipe connecting joint as claimed in claim 5, wherein the raised side and the recessed side of the sleeves are coated with an adhesive layer.

7. The pipe connecting joint as claimed in claim 1, wherein the two discs of the two limiting pipes are respectively provided with a raised portion and a recessed portion for secure engagement of the two limiting pipes.

8. The pipe connecting joint as claimed in claim 1, wherein each limiting pipe is tightened by way of at least one a sealing member at the corresponding semicircular pipe.

9. The pipe connecting joint as claimed in claim 1, wherein each limiting pipe is further provided with at least one through opening at the corresponding disc.

10. The pipe connecting joint as claimed in claim 1, wherein the connecting member is coated with an adhesive layer to adhere onto and seal the outer pipes of the external transportation pipes.

* * * * *